US012025353B2

(12) United States Patent
Zhou et al.

(10) Patent No.: US 12,025,353 B2
(45) Date of Patent: Jul. 2, 2024

(54) OIL RETURN CONTROL METHOD OF MULTI-FUNCTIONAL MULTI-SPLIT SYSTEM WITH DOUBLE FOUR-WAY VALVES

(71) Applicant: Guangdong Giwee Technology Co. Ltd., Foshan (CN)

(72) Inventors: Min Zhou, Foshan (CN); Hongbin Liu, Foshan (CN)

(73) Assignee: GUANGDONG GIWEE TECHNOLOGY CO. LTD., Foshan (CN)

( * ) Notice: Subject to any disclaimer, the term of this patent is extended or adjusted under 35 U.S.C. 154(b) by 211 days.

(21) Appl. No.: 17/564,360

(22) Filed: Dec. 29, 2021

(65) Prior Publication Data

US 2022/0205692 A1 Jun. 30, 2022

(51) Int. Cl.
*F25B 31/00* (2006.01)
*F25B 13/00* (2006.01)

(52) U.S. Cl.
CPC ............ *F25B 31/004* (2013.01); *F25B 13/00* (2013.01); *F25B 2313/02742* (2013.01); *F25B 2400/23* (2013.01); *F25B 2600/2513* (2013.01)

(58) Field of Classification Search
CPC .................... F25B 31/004; F25B 13/00; F25B 2313/02742; F25B 2400/23; F25B 2600/2513; F25B 31/002; F25B 41/00; F25B 41/20; F25B 41/22; F25B 41/30; F25B 41/31; F25B 2313/0293; F25B 2500/16; F25B 2600/11
See application file for complete search history.

(56) References Cited

U.S. PATENT DOCUMENTS 7,607,317 B2 10/2009 Honda et al.
10,557,648 B2 2/2020 Naito et al.
2019/0063793 A1* 2/2019 Tang ...................... F25B 41/20
2020/0132314 A1* 4/2020 Kojima .................. F25B 41/20

OTHER PUBLICATIONS

European Search Report for application EP 21217551.7, dated May 23, 2022, 6 pages.

* cited by examiner

*Primary Examiner* — Henry T Crenshaw
*Assistant Examiner* — Kamran Tavakoldavani
(74) *Attorney, Agent, or Firm* — CANTOR COLBURN LLP

(57) ABSTRACT

An oil return control method of a multi-functional multi-split system with double four-way valves. The multi-functional multi-split system includes an outdoor unit, at least one set of hydraulic modules and at least one set of indoor modules. When the multi-split system is switched from a normal operation mode to an oil return mode, a first four-way valve and a second four-way valve are powered down, and operation modes of each set of indoor modules and each set of hydraulic modules, the on/off state of fans of an indoor heat exchanger and a hydraulic heat exchanger, opening degrees of a first electronic expansion valve of the indoor heat exchanger and a first electronic expansion valve of the hydraulic heat exchanger, and the on/off state of a first electromagnetic valve and a second electromagnetic valve are correspondingly adjusted based on the previous operation modes.

10 Claims, 2 Drawing Sheets

100
4
2
S
C
D
E
S
C
E
D
3
1
5
6
LIQUID PIPE
7
HIGH-LOW PRESSURE GAS PIPE
8
HIGH PRESSURE GAS PIPE
9
300
12
11
14
200
10
13
WATER INLET
WATER OUTLET
LIQUID PIPE
HIGH-LOW PRESSURE GAS PIPE
HIGH PRESSURE GAS PIPE

OIL RETURN CONTROL METHOD OF MULTI-FUNCTIONAL MULTI-SPLIT SYSTEM WITH DOUBLE FOUR-WAY VALVES

FOREIGN PRIORITY

This application claims priority to Chinese Patent Application No. 202011635383.1, filed Dec. 31, 2020, and all the benefits accruing therefrom under 35 U.S.C. § 119, the contents of which in its entirety are herein incorporated by reference.

TECHNICAL FIELD

The present disclosure relates to the technical field of multi-split air conditioner systems, and in particular, to an oil return control method of a multi-functional multi-split system with double four-way valves.

BACKGROUND

In an air conditioner system, refrigerating machine oil of a compressor and a refrigerant are mutually soluble. The refrigerating machine oil of the compressor will reach any corner in a system pipeline with the refrigerant, while a multi-split system is formed by an outdoor unit equipped with a lot of air conditioner indoor units. Since the pipeline is long, the drop is large, a large number of units are connected, and the indoor units are partially turned on and partially turned off, the refrigerating machine oil of the compressor will be accumulated in the system pipeline. As a result, it is necessary to regularly run an oil return program, so that the refrigerant in the system pipeline can flow back to the compressor with the flow of the refrigerant to ensure the reliable operation of the compressor.

When a system where a multi-split outdoor unit is equipped with air conditioner indoor units and hydraulic modules needs oil return, it is usually required to convert all the air conditioner indoor units into a refrigeration state and the hydraulic modules into a water refrigeration state, which has a problem: when the hydraulic modules are converted into water refrigeration, if the hydraulic modules are not in water heating originally, the water temperature in the hydraulic modules will be very low, and the risk of water freezing and bursting the pipeline will be easily caused after the modules are converted into water refrigeration. In addition, even if the hydraulic modules are in water heating originally, the temperature of hot water will be easily reduced after the modules are converted into the water refrigeration state, causing a user's complaint. Furthermore, if the hydraulic modules are in an off state originally, even if the hydraulic modules are converted into water refrigeration, the refrigerant in a high-pressure gas pipe still cannot flow, resulting in the accumulation of compressor oil in the high-pressure gas pipe and the failure of normal recovery, and long-term operation will cause the compressor to burn out due to lack of oil.

SUMMARY

An objective of the present invention is to overcome the deficiencies of the prior art and provide an oil return control method of a multi-functional multi-split system with double four-way valves, which is multi-functional, energy-saving, and efficient.

In order to achieve the above objective, the present invention provides an oil return control method of a multi-functional multi-split system with double four-way valves. The multi-split system includes an outdoor unit, at least one set of hydraulic modules, at least one set of indoor modules, a liquid pipe, a high-low pressure gas pipe, and a high-pressure gas pipe. The outdoor unit includes a compressor, a first four-way valve, a second four-way valve, and an outdoor heat exchanger. An output end of the compressor is respectively connected to port D of the first four-way valve and port D of the second four-way valve, and an input end of the compressor is respectively connected to port S of the first four-way valve and port S of the second four-way valve. Port E of the first four-way valve is connected to port S of the second four-way valve via a throttling unit. Port C of the second four-way valve is connected to port S of the first four-way valve via a throttling unit. Port C of the first four-way valve is connected to the outdoor heat exchanger. One end of the liquid pipe is connected to the outdoor heat exchanger, and the other end of the liquid pipe is respectively connected to the other end of a hydraulic heat exchanger of each set of hydraulic modules and the other end of an indoor heat exchanger of each set of indoor modules. One end of the high-pressure gas pipe is connected between the four-way valves and the output end of the compressor by bypassing, and the other end of the high-pressure gas pipe is connected to one end of the hydraulic heat exchanger of each set of hydraulic modules. One end of the high-low pressure gas pipe is connected to port E of the second four-way valve, and the other end of the high-low pressure gas pipe is respectively connected to one end of the hydraulic heat exchanger of each set of hydraulic modules and one end of the indoor heat exchanger of each set of indoor modules. A first electronic expansion valve is arranged between the liquid pipe and each hydraulic heat exchanger and each indoor heat exchanger. A first electromagnetic valve is arranged between the high-pressure gas pipe and any one of the hydraulic heat exchangers. A second electromagnetic valve is arranged between the high-low pressure gas pipe and any one of the hydraulic heat exchangers. When the multi-split system is switched from a normal operation mode to an oil return mode, the first four-way valve and the second four-way valve are powered down, and operation modes of each set of indoor modules and each set of hydraulic modules, the on/off state of fans of the indoor heat exchangers and the hydraulic heat exchangers, opening degrees of the first electronic expansion valves of the indoor heat exchangers and the first electronic expansion valves of the hydraulic heat exchangers, and the on/off state of the first electromagnetic valves and the second electromagnetic valves are correspondingly adjusted based on the previous operation modes of each set of indoor modules and each set of hydraulic modules.

Further, when the multi-split system only has one or more sets of indoor modules switched from a refrigeration mode to the oil return mode, the first four-way valve and the second four-way valve are powered down, the indoor module previously in the refrigeration mode remains a current operating state, the fan of the indoor module previously in an air supply state remains on and the first electronic expansion valve thereof is adjusted to a predetermined opening degree, and the first electronic expansion valve of the indoor module previously in an off state is adjusted to a predetermined opening degree.

Further, when the multi-split system only has one or more sets of indoor modules switched from a heating mode to the oil return mode, the first four-way valve and the second four-way valve are powered down, the indoor module previously in the heating mode is switched to refrigeration use and the fan thereof is turned off, the indoor module previously in an off state remains off, and the first electronic expansion valves of the indoor heat exchangers of all the indoor modules are adjusted to a predetermined opening degree.

Further, when the multi-split system only has one or more sets of indoor modules switched from a heating/refrigeration mode to the oil return mode, the first electromagnetic valve of each set of hydraulic modules previously in an off state is turned off and the second electromagnetic valve is turned on, and the first electronic expansion valve of each set of hydraulic modules is adjusted to a predetermined opening degree.

Further, when the multi-split system only has one or more sets of hydraulic modules switched from a water heating mode to the oil return mode, the first four-way valve and the second four-way valve are powered down, each set of indoor modules previously in an off state remains off, the fan of each set of indoor modules previously in an air supply state remains on, and the first electronic expansion valves of the indoor heat exchangers of all the indoor modules are adjusted to a predetermined opening degree.

Further, when the multi-split system has one or more sets of indoor modules operating in a heating mode and one or more sets of hydraulic modules operating in a water heating mode, the first four-way valve and the second four-way valve are powered down, each set of indoor modules previously in an off state remains off, each set of indoor modules previously in the heating mode is switched to refrigeration use and the fan thereof is turned off, the fan of each set of indoor modules previously in an air supply state remains on, and the first electronic expansion valves of the indoor heat exchangers of all the indoor modules are adjusted to a predetermined opening degree.

Further, when the multi-split system has one or more sets of indoor modules switched from a refrigeration mode to the oil return mode and one or more sets of hydraulic modules switched from a water heating mode to the oil return mode, the first four-way valve and the second four-way valve are powered down, the indoor module previously in the refrigeration mode remains a current operating state, the fan of the indoor module previously in an air supply state remains on, and the first electronic expansion valves of the indoor heat exchangers of the indoor modules previously in the air supply state and an off state are adjusted to a predetermined opening degree.

Further, when the multi-split system only has one or more sets of hydraulic modules switched from a water heating mode to the oil return mode, or has one or more sets of indoor modules switched from a heating mode to the oil return mode and one or more sets of hydraulic modules switched from a water heating mode to the oil return mode, or has one or more sets of indoor modules switched from a refrigeration mode to the oil return mode and one or more sets of hydraulic modules switched from a water heating mode to the oil return mode, the first electromagnetic valve of each set of hydraulic modules is turned off and the second electromagnetic valve is turned on, each set of hydraulic modules previously in the water heating mode remains a current operating state, each set of hydraulic modules previously in an off state remains off, and the first electronic expansion valve thereof is adjusted to a predetermined opening degree.

Further, an oil separator arranged at the output end of the compressor is also included.

Further, a gas-liquid separator arranged at the input end of the compressor is also included.

The present invention adopts the above solution and has the beneficial effects in that: 1) the system can recover hot water and reduce energy consumption while the indoor module is refrigerating; 2) the product functionality is rich, and multiple requirements are solved through a set of equipment; and 3) switching to an oil return mode for the corresponding adjustment motion according to different operating conditions not only can ensure that oil in a system pipeline can be recovered with the flow of a refrigerant in the pipeline, but also can ensure that a hydraulic module has no risk of freezing and bursting, the oil return effect is good, and the system reliability is high.

In the figures, 100: outdoor unit, 200: hydraulic module, 300: indoor module, 1: compressor, 2: first four-way valve, 3: second four-way valve, 4: outdoor heat exchanger, 5: oil separator, 6: gas-liquid separator, 7: liquid pipe, 8: high-low pressure gas pipe, 9: high-pressure gas pipe, 10: hydraulic heat exchanger, 11: indoor heat exchanger, 12: first electronic expansion valve, 13: first electromagnetic valve, 14: second electromagnetic valve.

DETAILED DESCRIPTION OF THE INVENTION

In order to facilitate an understanding of the present invention, a more complete description of the present invention will be rendered by reference to the accompanying drawings. Preferred embodiments of the present invention are shown in the accompanying drawings. The present invention may, however, be embodied in many different forms and should not be limited to the embodiments set forth herein. These embodiments are provided so that the disclosure of the present invention will be understood thoroughly and completely.

Figure 1:
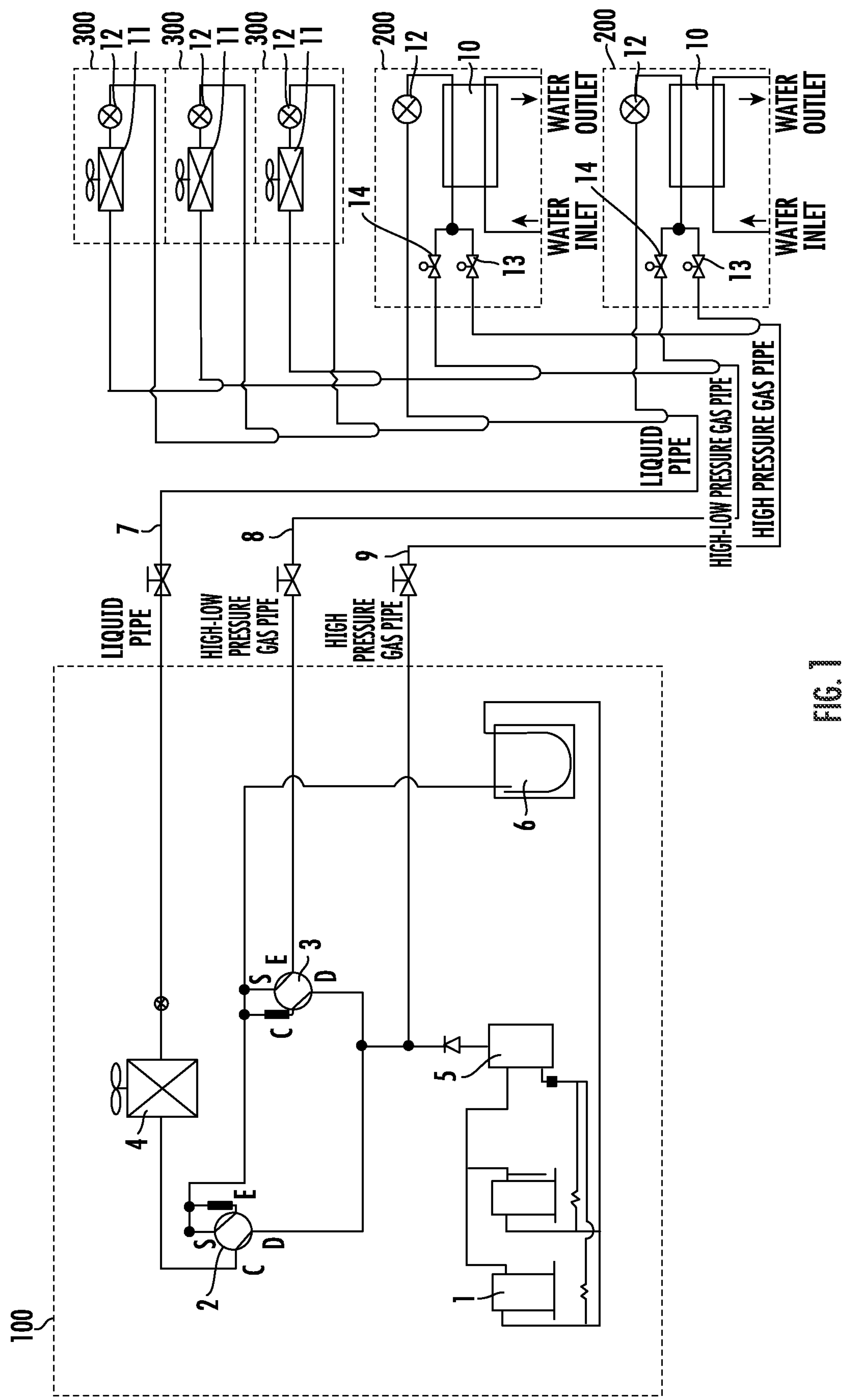
FIG. 1 is a schematic diagram showing connection components of a multi-split system.

Referring to FIG. 1, in the present embodiment, a multi-split system includes an outdoor unit 100, at least one set of hydraulic modules 200 and at least one set of indoor modules 300. In order to facilitate the explanation of the present embodiment, two sets of hydraulic modules 200 arranged in parallel and three sets of indoor modules 300 arranged in parallel are included herein.

In the present embodiment, the outdoor unit 100 includes a compressor 1, a first four-way valve 2, a second four-way valve 3, an outdoor heat exchanger 4, an oil separator 5, and a gas-liquid separator 6. Each of the first four-way valve 2 and the second four-way valve 3 includes four ports C, D, E, and S. An output end of the compressor 1 is respectively connected to port D of the first four-way valve 2 and port D of the second four-way valve 3 via the oil separator 5, and an input end of the compressor 1 is respectively connected to port S of the first four-way valve 2 and port S of the second four-way valve 3 via the gas-liquid separator 6. Port C of the first four-way valve 2 is connected to one end of the outdoor heat exchanger 4. Port E of the first four-way valve 2 is connected to port S of the second four-way valve 3 via a throttling unit. Port C of the second four-way valve is connected to port S of the first four-way valve 2 via a throttling unit.

Further, when the first four-way valve 2 is powered down, port D thereof is in communication with port C, and port E is in communication with port S, while when the first four-way valve 2 is powered up, port D is in communication with port E. Since a capillary connection is used at port E, the refrigerant throughput is actually small, which is equivalent to no refrigerant passing from port D to port E.

Further, when the second four-way valve 3 is powered down, port D thereof is in communication with port C, and port E is in communication with port S. Since a capillary connection is used at port C, the refrigerant throughput is actually small, which is equivalent to no refrigerant passing from port D to port C. When the second four-way valve 3 is powered up, port D thereof is in communication with port E, and port C is in communication with port S.

Further, in order to ensure that the compressor 1 has sufficient output power in the multi-split system, at least two compressors 1 arranged in parallel may be provided, so that the compressors 1 can be started as needed.

In the present embodiment, each hydraulic module 200 includes a hydraulic heat exchanger 10. Each indoor module 300 includes an indoor heat exchanger 11. A liquid pipe 7, a high-low pressure gas pipe 8 and a high-pressure gas pipe 9 are also included. Port E of the second four-way valve 3 is connected to one end of the high-low pressure gas pipe 8, and the other end of the high-low pressure gas pipe 8 is respectively connected to one end of the hydraulic heat exchanger 10 and one end of the indoor heat exchanger 11 through a branch pipe. One end of the liquid pipe 7 is connected to the outdoor heat exchanger 4, and the other end of the liquid pipe 7 is respectively connected to the other end of the hydraulic heat exchanger 10 and the other end of the indoor heat exchanger 11. One end of the high-pressure gas pipe 9 is connected between the four-way valves and the output end of the compressor 1 by bypassing, and the other end of the high-pressure gas pipe 9 is connected to one end of the hydraulic heat exchanger 10.

Further, an electronic expansion valve is arranged between the liquid pipe 7 and each hydraulic heat exchanger 10 and each indoor heat exchanger 11.

Further, an outdoor unit electronic expansion valve is arranged at one end of the liquid pipe 7 adjacent to a heat exchanger. In the present embodiment, a first electromagnetic valve 13 is arranged between the high-pressure gas pipe 9 and any one of the hydraulic heat exchangers 10, and a second electromagnetic valve 14 is arranged between the high-low pressure gas pipe 8 and any one of the hydraulic heat exchangers 10. The on/off state of the first electromagnetic valve 13 and the second electromagnetic valve 14 are correspondingly switched according to the operation mode requirements of the multi-split system.

Further, the high-low pressure gas pipe 8 is connected to one end of the hydraulic heat exchanger 10 and the indoor heat exchanger 11 through a branch pipe, and the liquid pipe 7 is respectively connected to the hydraulic heat exchanger 10 and the indoor heat exchanger 11 through a branch pipe.

Specifically, the multi-split system includes the following operation modules.

1) In a case where only the indoor module 300 operates in a refrigeration mode. At this moment, the first four-way valve 2 is powered down, the second four-way valve 3 is powered down, the first electronic expansion valves 12 of all the hydraulic modules 200 are turned off, the first electromagnetic valve 13 and the second electromagnetic valve 14 are both turned off, the outdoor heat exchanger 4 serves as a condenser, and the indoor heat exchanger 11 serves as an evaporator. At this moment, a high-temperature and high-pressure refrigerant discharged from the compressor 1 enters the outdoor heat exchanger 4 to be condensed via the oil separator 5 and the first four-way valve 2, then enters the indoor heat exchanger 11 to be evaporated after being throttled by the liquid pipe 7 and the first electronic expansion valve 12 of the indoor heat exchanger 11, and then flows back to the compressor 1 through the high-low pressure gas pipe 8, the four-way valves, and the gas-liquid separator 6. The above flow path is repeatedly circulated. At this moment, a low-pressure gaseous refrigerant flows through the high-low pressure gas pipe 8.

2) In a case where only the indoor module 300 operates with a heating module. At this moment, the first four-way valve 2 and the second four-way valve 3 are powered up, the first electronic expansion valves 12 of all the hydraulic modules 200 are turned off, the first electromagnetic valve 13 and the second electromagnetic valve 14 are both turned off, the outdoor heat exchanger 4 serves as an evaporator, and the indoor heat exchanger 11 serves as a condenser. At this moment, a high-temperature and high-pressure refrigerant discharged from the compressor 1 enters the indoor heat exchanger 11 to be condensed via the oil separator 5, the four-way valves, and the high-low pressure gas pipe 8, then enters the indoor heat exchanger 11 to be evaporated via the liquid pipe 7 after being throttled by the first electronic expansion valve 12 of the indoor heat exchanger 11, and then flows back to the compressor 1 via the four-way valves and the gas-liquid separator 6. The above flow path is repeatedly circulated. At this moment, a high-pressure gaseous refrigerant flows through the high-low pressure gas pipe 8.

3) In a case where the indoor module 300 operates in a refrigeration mode and the hydraulic module 200 operates in a water heating mode (heat recovery at this moment). A suitable mode may be selected accordingly according to the magnitude of a refrigeration demand for the multi-split system. When the refrigeration demand for the multi-split system is large and the water heating demand is small, the following mode may be used. At this moment, the first four-way valve 2 and the second four-way valve 3 are powered down, the first electronic expansion valve 12 of the hydraulic module 200 is turned on, the first electromagnetic valve 13 is turned on, the second electromagnetic valve 14 is turned off, the outdoor heat exchanger 4 serves as a condenser, the indoor heat exchanger 11 serves as an evaporator, and the hydraulic heat exchanger 10 serves as a condenser. At this moment, a high-temperature and high-pressure refrigerant discharged from the compressor 1 is divided into two parts via the oil separator 5. One part of the refrigerant enters the outdoor heat exchanger 4 to be condensed via the first four-way valve 2 and then enters the liquid pipe 7. The other part of the high-temperature and high-pressure refrigerant enters the hydraulic heat exchanger 10 to be condensed for heat release via the high-pressure gas pipe 9, and then enters the liquid pipe 7 after being throttled by the first electronic expansion valve 12 of the hydraulic heat exchanger 10. The two parts of the refrigerant are mixed in the liquid pipe 7, then enter the indoor heat exchanger 11 to be evaporated, and then flow back to the compressor 1 through the high-low pressure gas pipe 8, the second four-way valve 3, and the gas-liquid separator 6. The above flow path is repeatedly circulated. At this moment, a low-pressure gaseous refrigerant flows through the high-low pressure gas pipe 8.

When the refrigeration demand for the multi-split system is small and the water heating demand is large, the following mode may be used. At this moment, the first four-way valve 2 is powered up, the second four-way valve 3 is powered down, the first electronic expansion valve 12 of the hydraulic module 200 is turned on, the first electromagnetic valve 13 is turned on, the second electromagnetic valve 14 is turned off, the outdoor heat exchanger 4 serves as an evaporator, the indoor heat exchanger 11 serves as an evaporator, and the hydraulic heat exchanger 10 serves as a condenser. At this moment, a high-temperature and high-pressure refrigerant discharged from the compressor 1 enters the hydraulic heat exchanger 10 to be condensed for heat release via the oil separator 5 and the high-pressure gas pipe 9, and then enters the liquid pipe 7 to be divided into two parts after being throttled by the first electronic expansion valve 12 of the hydraulic heat exchanger 10. One part of the refrigerant enters the indoor heat exchanger 11 to be evaporated, and then flows back to the compressor 1 along the high-low pressure gas pipe 8, the second four-way valve 3, and the gas-liquid separator 6. The other part of the refrigerant enters the outdoor heat exchanger 4 to be evaporated for heat absorption and then flows back to the compressor 1 via the first four-way valve 2 and the gas-liquid separator 6. The above flow path is repeatedly circulated. At this moment, a low-pressure gaseous refrigerant flows through the high-low pressure gas pipe 8.

4) In a case where the indoor module 300 operates in a heating mode and the hydraulic module 200 operates in water heating. At this moment, the first four-way valve 2 and the second four-way valve 3 are powered up, the first electronic expansion valve 12 of the hydraulic module 200 is turned on, the first electromagnetic valve 13 is turned on, the second electromagnetic valve 14 is turned off, the outdoor heat exchanger 4 serves as an evaporator, the indoor heat exchanger 11 serves as a condenser, and the hydraulic heat exchanger 10 serves as a condenser. At this moment, a high-temperature and high-pressure refrigerant discharged from the compressor 1 is divided into two parts via the oil separator 5. One part of the refrigerant enters the hydraulic heat exchanger 10 to be condensed for heat release via the high-pressure gas pipe 9, and then enters the liquid pipe 7 after being throttled by the first electronic expansion valve 12 of the hydraulic heat exchanger 10. The other part of the refrigerant enters the indoor heat exchanger 11 to be condensed via the second four-way valve 3 and the high-low pressure gas pipe 8 and then enters the liquid pipe 7. The two parts of the refrigerant are mixed together, flow into the outdoor heat exchanger 4 to be evaporated via the liquid pipe 7, and then flow back to the compressor 1 via the first four-way valve and the gas-liquid separator 6. The above flow path is repeatedly circulated. At this moment, a high-pressure gaseous refrigerant flows through the high-low pressure gas pipe 8.

5) In a case where only the hydraulic module 200 operates in water heating. At this moment, the first four-way valve 2 is powered up, the second four-way valve 3 is powered down, the first electronic expansion valve 12 of the indoor heat exchanger 11 is turned off, the first electronic expansion valve 12 of the hydraulic heat exchanger 10 is turned on, the first electromagnetic valve 13 is turned on, the second electromagnetic valve 14 is turned off, the outdoor heat exchanger 4 serves as an evaporator, the indoor heat exchanger 11 does not work, and the hydraulic heat exchanger 10 serves as a condenser. At this moment, a high-temperature and high-pressure refrigerant discharged from the compressor 1 enters the hydraulic heat exchanger 10 to be condensed for heat release via the high-pressure gas pipe 9, then enters the outdoor heat exchanger 4 to be evaporated via the liquid pipe 7 after being throttled by the first electronic expansion valve 12 of the hydraulic heat exchanger 10, and then flows back to the compressor 1 through the first four-way valve 2 and the gas-liquid separator 6. The above flow path is repeatedly circulated. At this moment, a high-pressure gaseous refrigerant flows through the high-low pressure gas pipe 8.

6) In a case where the indoor module 300 operates in refrigeration and the hydraulic module 200 operates in water refrigeration. At this moment, the first four-way valve 2 and the second four-way valve 3 are powered down, the first electronic expansion valve 12 of the indoor heat exchanger 11 is turned off, the first electronic expansion valve 12 of the hydraulic heat exchanger 10 is turned on, the first electromagnetic valve 13 is turned off, the second electromagnetic valve 14 is turned on, the outdoor heat exchanger 4 serves as a condenser, the indoor heat exchanger 11 serves as an evaporator, and the hydraulic heat exchanger 10 serves as an evaporator. At this moment, a high-temperature and high-pressure refrigerant discharged from the compressor 1 enters the outdoor heat exchanger 4 to be condensed via the oil separator 5 and the first four-way valve 2, and then is divided into two parts via the liquid pipe 7, which respectively enter the indoor heat exchanger 11 and the hydraulic heat exchanger 10 to be evaporated, then enter the high-low pressure gas pipe 8, the four-way valves, and the gas-liquid separator 6 respectively and then flow back to the compressor 1. The above flow path is repeatedly circulated. At this moment, a low-pressure gaseous refrigerant flows through the high-low pressure gas pipe 8.

7) In a case where only the hydraulic module 200 operates in water refrigeration. At this moment, the first four-way valve 2 and the second four-way valve 3 are powered down, the first electronic expansion valve 12 of the indoor heat exchanger 11 is turned off, the first electronic expansion valve 12 of the hydraulic heat exchanger 10 is turned on, the first electromagnetic valve 13 is turned off, the second electromagnetic valve 14 is turned on, the outdoor heat exchanger 4 serves as a condenser, the indoor heat exchanger 11 does not work, and the hydraulic heat exchanger 10 serves as an evaporator. At this moment, a high-temperature and high-pressure refrigerant discharged from the compressor 1 enters the outdoor heat exchanger 4 to be condensed via the oil separator 5 and the first four-way valve 2, then enters the hydraulic heat exchanger 10 to be evaporated via the liquid pipe 7, and then flows back to the compressor 1 through the high-low pressure gas pipe 8, the second four-way valve 3, and the gas-liquid separator 6. The above flow path is repeatedly circulated. At this moment, a low-pressure gaseous refrigerant flows through the high-low pressure gas pipe 8.

Based on all the above operation modules, the multi-split system may perform water heating or water refrigeration selectively as demanded while refrigeration, so as to achieve the effect of energy saving. A multi-split product has the characteristic of being multi-functional.

Figure 2:
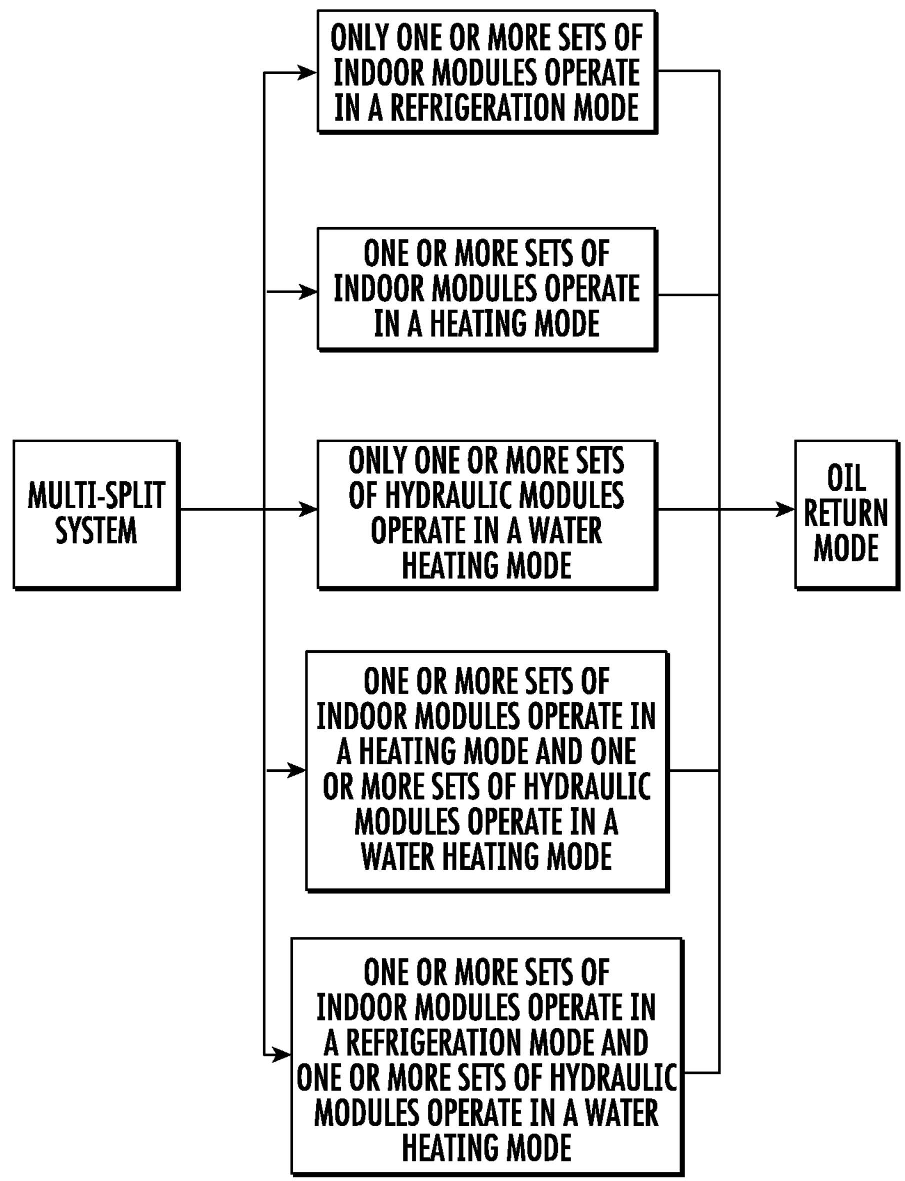
FIG. 2 is a schematic diagram showing an oil return mode of a multi-split system.

FIG. 2 is a schematic diagram showing an oil return mode of a multi-split system. The oil return mode may be controlled by a control unit, such as a micro-processor based controller, controlling valves or other components of the system. Referring to FIG. 2, in the present embodiment, when the multi-split system is switched from the above normal operation mode to the oil return mode, the first four-way valve 2 and the second four-way valve 3 are powered down, and operation modes of each set of indoor modules and each set of hydraulic modules, the on/off state of fans of the indoor heat exchanger 11 and the hydraulic heat exchanger 10, opening degrees of the first electronic expansion valve 12 of the indoor heat exchanger 11 and the first electronic expansion valve 12 of the hydraulic heat exchanger 10, and the on/off state of the first electromagnetic valve 13 and the second electromagnetic valve 14 are correspondingly adjusted based on the previous operation modes of each set of indoor modules and each set of hydraulic modules.

For ease of understanding, the oil return mode is further explained below in connection with the following four operation conditions.

1) In the present embodiment, when the multi-split system only has one or more sets of indoor modules 300 switched from a refrigeration mode to an oil return mode, at least one set of indoor modules 300 is operating in the refrigeration mode at this moment, or some indoor modules may be in an off state or an air supply state, and all the hydraulic modules 200 are in an off state. Then, the first four-way valve 2 and the second four-way valve 3 are powered down, the indoor module 300 previously in the refrigeration mode remains a current operation state (i.e., the indoor module 300 remains operating in the refrigeration mode, the fan remains on, and the first electronic expansion valve remains a current opening degree), and the fan of the indoor module 300 previously in an air supply state remains on and the first electronic expansion valve 12 thereof is adjusted to a predetermined opening degree (preferably 300 pulses). The first electronic expansion valve 12 of the indoor module 300 previously in an off state is adjusted to a predetermined opening (preferably 300 pulses). In this way, the high-temperature and high-pressure refrigerant discharged from the compressor 1 enters the outdoor heat exchanger 4 to be condensed for heat release via the first four-way valve 2, the condensed refrigerant enters each set of indoor heat exchangers 11 to be evaporated for heat absorption, and finally the refrigerant flows back to the compressor 1 via the high-low pressure gas pipe 8, the second four-way valve 3, and the gas-liquid separator. In addition, the first electromagnetic valve 13 of each set of hydraulic modules 200 previously in the off state is turned off and the second electromagnetic valve 14 is turned on, and the first electronic expansion valve 12 of each set of hydraulic modules 200 is adjusted to a predetermined opening degree. In this way, the high-temperature and high-pressure refrigerant discharged from the compressor enters the hydraulic modules to heat water via the high-pressure gas pipe, so that the hydraulic modules are in a high temperature state, and there is no possibility of freezing and bursting in a water path thereof. In addition, since the oil return time is generally short, the water temperature will not be excessively high.

2) In the present embodiment, when the multi-split system only has one or more sets of indoor modules 300 operating in a heating mode, at least one set of indoor modules 300 is operating in the heating mode at this moment, or some indoor modules may be in an off state, no indoor modules are in an air supply state, and all the hydraulic modules 200 are in an off state. Then, the first four-way valve 2 and the second four-way valve 3 are powered down, the indoor module 300 previously in the heating mode is switched to refrigeration use and the fan thereof is turned off, the indoor module 300 previously in an off state remains off, and the first electronic expansion valves 12 of the indoor heat exchangers 11 of all the indoor modules 300 are adjusted to a predetermined opening degree (preferably 300 pulses). In this way, a high-temperature and high-pressure refrigerant discharged from the compressor 1 enters the outdoor heat exchanger 4 to be condensed for heat release via the first four-way valve 2, the condensed refrigerant enters each set of indoor heat exchangers 11 to be evaporated for heat absorption, and finally the refrigerant flows back to the compressor 1 via the high-low pressure gas pipe 8, the second four-way valve 3, and the gas-liquid separator. In addition, the first electromagnetic valve 13 of each set of hydraulic modules 200 previously in the off state is turned off and the second electromagnetic valve 14 is turned on, and the first electronic expansion valve 12 of each set of hydraulic modules 200 is adjusted to a predetermined opening degree. In this way, the high-temperature and high-pressure refrigerant discharged from the compressor enters the hydraulic modules to heat water via the high-pressure gas pipe, so that the hydraulic modules are in a high temperature state, and there is no possibility of freezing and bursting in a water path thereof. In addition, since the oil return time is generally short, the water temperature will not be excessively high.

3) When the multi-split system only has one or more sets of hydraulic modules 200 operating in a water heating mode, there are indoor modules in the sets of indoor modules 300 in an air supply state or an off state, no indoor modules are in a refrigeration or heating mode, at least one set of hydraulic modules 200 is in a heating mode, and some hydraulic modules may be in an off mode. Then, the first four-way valve 2 and the second four-way valve 3 are powered down, each set of indoor modules 300 previously in an off state remains off, the fan of each set of indoor modules 300 previously in an air supply state remains on, and the first electronic expansion valves 12 of the indoor heat exchangers 11 of all the indoor modules 300 are adjusted to a predetermined opening degree (preferably 300 pulses). In this way, a high-temperature and high-pressure refrigerant discharged from the compressor 1 enters the outdoor heat exchanger 4 to be condensed for heat release via the first four-way valve 2, the condensed refrigerant enters each set of indoor heat exchangers 11 to be evaporated for heat absorption, and finally the refrigerant flows back to the compressor 1 via the high-low pressure gas pipe 8, the second four-way valve 3, and the gas-liquid separator. In addition, the first electromagnetic valve 13 of each set of hydraulic modules 200 is turned off and the second electromagnetic valve 14 is turned on, each set of hydraulic modules 200 previously in the water heating mode remains a current operation state (i.e., the hydraulic module 200 remains operating in the water heating mode, the first electromagnetic valve 13 is turned off, the second electromagnetic valve 14 is turned on, and the first electronic expansion valve 12 remains a current opening degree), each set of hydraulic modules 200 previously in the off state remains off and the first electronic expansion valve 12 thereof is adjusted to a predetermined opening degree. In this way, the high-temperature and high-pressure refrigerant discharged from the compressor enters the hydraulic modules to heat water via the high-pressure gas pipe, so that the hydraulic modules are in a high temperature state, and there is no possibility of freezing and bursting in a water path thereof. In addition, since the oil return time is generally short, the water temperature will not be excessively high.

4) When the multi-split system has one or more sets of indoor modules 300 operating in a heating mode and one or more sets of hydraulic modules 200 operating in a water heating mode, at least one set of indoor modules 300 is operating in the heating mode at this moment, or there may be some indoor modules in an off state, and no indoor modules are in a refrigeration mode or an air supply state. At least one set of hydraulic modules 200 is operating in the water heating mode, there may be some hydraulic modules in an off state, and no hydraulic modules are in a water refrigeration mode. Then, the first four-way valve 2 and the second four-way valve 3 are powered down, each set of indoor modules 300 previously in an off state remains off, each set of indoor modules 300 previously in the heating mode is switched to refrigeration use and the fan thereof is turned off, the fan of each set of indoor modules 300 previously in an air supply state remains on, and the first electronic expansion valves 12 of the indoor heat exchangers 11 of all the indoor modules 300 are adjusted to a predetermined opening degree (preferably 300 pulses). In this way, a high-temperature and high-pressure refrigerant discharged from the compressor 1 enters the outdoor heat exchanger 4 to be condensed for heat release via the first four-way valve 2, the condensed refrigerant enters each set of indoor heat exchangers 11 to be evaporated for heat absorption, and finally the refrigerant flows back to the compressor 1 via the high-low pressure gas pipe 8, the second four-way valve 3, and the gas-liquid separator. In addition, the first electromagnetic valve 13 of each set of hydraulic modules 200 is turned off and the second electromagnetic valve 14 is turned on, each set of hydraulic modules 200 previously in the water heating mode remains a current operation state (i.e., the hydraulic module 200 remains operating in the water heating mode, the first electromagnetic valve 13 is turned off, the second electromagnetic valve 14 is turned on, and the first electronic expansion valve 12 remains a current opening degree), each set of hydraulic modules 200 previously in the off state remains off and the first electronic expansion valve 12 thereof is adjusted to a predetermined opening degree. In this way, the high-temperature and high-pressure refrigerant discharged from the compressor enters the hydraulic modules to heat water via the high-pressure gas pipe, so that the hydraulic modules are in a high temperature state, and there is no possibility of freezing and bursting in a water path thereof. In addition, since the oil return time is generally short, the water temperature will not be excessively high.

5) When the multi-split system has one or more sets of indoor modules 300 operating in a refrigeration mode and one or more sets of hydraulic modules (200) operating in a water heating mode, at least one set of indoor modules 300 is operating in the refrigeration mode at this moment, or there may be some indoor modules in an off state, and no indoor modules are in a heating mode or an air supply state. At least one set of hydraulic modules 200 is operating in the water heating mode, there may be some hydraulic modules in an off state, and no hydraulic modules are in a water refrigeration mode. Then, the first four-way valve 2 and the second four-way valve 3 are powered down, the indoor module 300 previously in the refrigeration mode remains a current operating state, the fan of the indoor module 300 previously in an air supply state remains on, and the first electronic expansion valves 12 of the indoor heat exchangers 11 of the indoor modules 300 previously in the air supply state and an off state are adjusted to a predetermined opening degree (preferably 300 pulses). In this way, a high-temperature and high-pressure refrigerant discharged from the compressor 1 enters the outdoor heat exchanger 4 to be condensed for heat release via the first four-way valve 2, the condensed refrigerant enters each set of indoor heat exchangers 11 to be evaporated for heat absorption, and finally the refrigerant flows back to the compressor 1 via the high-low pressure gas pipe 8, the second four-way valve 3, and the gas-liquid separator. In addition, the first electromagnetic valve 13 of each set of hydraulic modules 200 is turned off and the second electromagnetic valve 14 is turned on, each set of hydraulic modules 200 previously in the water heating mode remains a current operation state (i.e., the hydraulic module 200 remains operating in the water heating mode, the first electromagnetic valve 13 is turned off, the second electromagnetic valve 14 is turned on, and the first electronic expansion valve 12 remains a current opening degree), each set of hydraulic modules 200 previously in the off state remains off and the first electronic expansion valve 12 thereof is adjusted to a predetermined opening degree. In this way, the high-temperature and high-pressure refrigerant discharged from the compressor enters the hydraulic modules to heat water via the high-pressure gas pipe, so that the hydraulic modules are in a high temperature state, and there is no possibility of freezing and bursting in a water path thereof. In addition, since the oil return time is generally short, the water temperature will not be excessively high.

By switching the above four different operation conditions to the oil return mode, a series of adjustment actions are performed on the indoor modules 300 and the hydraulic modules 200, so as to ensure that all pipelines of the system can operate while oil return can be achieved, there is no risk of freezing and bursting pipelines of the hydraulic modules, the oil return effect is good, and the system reliability is high.

The embodiments described above are merely preferred embodiments of the present invention and are not intended to limit the present invention in any way. Any person skilled in the art, without departing from the scope of the technical solution of the present invention, can use the technical content disclosed above to make more possible alterations, modifications, or changes to the technical solution of the present invention, all of which are equivalent embodiments of the present invention. Therefore, all equivalent changes made according to the idea of the present invention without departing from the content of the technical solution of the present invention should be covered within the protection scope of the present invention.

What is claimed is:

1. An oil return control method of a multi-functional multi-split system with double four-way valves, the multi-split system comprising an outdoor unit (100), at least one set of hydraulic modules (200), at least one set of indoor modules (300), a liquid pipe (7), a high-low pressure gas pipe (8), and a high-pressure gas pipe (9), wherein the outdoor unit (100) comprises a compressor (1), a first four-way valve (2), a second four-way valve (3), and an outdoor heat exchanger (4), an output end of the compressor (1) is respectively connected to port D of the first four-way valve (2) and port D of the second four-way valve (3), an input end of the compressor (1) is respectively connected to port S of the first four-way valve (2) and port S of the second four-way valve (3), port E of the first four-way valve (2) is connected to port S of the second four-way valve (3), port C of the second four-way valve (3) is connected to port S of the first four-way valve (2), and port C of the first four-way valve (2) is connected to the outdoor heat exchanger (4); one end of the liquid pipe (7) is connected to the outdoor heat exchanger (4), and the other end of the liquid pipe (7) is respectively connected to the other end of a hydraulic heat exchanger (10) of each set of hydraulic modules (200) and the other end of an indoor heat exchanger (11) of each set of indoor modules (300); one end of the high-pressure gas pipe (9) is connected between the four-way valves and the output end of the compressor (1) by bypassing, and the other end of the high-pressure gas pipe (9) is connected to one end of the hydraulic heat exchanger (10) of each set of hydraulic modules (200); one end of the high-low pressure gas pipe (8) is connected to port E of the second four-way valve (3), and the other end of the high-low pressure gas pipe (8) is respectively connected to one end of the hydraulic heat exchanger (10) of each set of hydraulic modules (200) and one end of the indoor heat exchanger (11) of each set of indoor modules (300); a first electronic expansion valve (12) is arranged between the liquid pipe (7) and each hydraulic heat exchanger (10) and each indoor heat exchanger (11); a first electromagnetic valve (13) is arranged between the high-pressure gas pipe (9) and any one of the hydraulic heat exchangers (10); a second electromagnetic valve (14) is arranged between the high-low pressure gas pipe (8) and any one of the hydraulic heat exchangers (10); when the multi-split system is switched from a normal operation mode to an oil return mode, the first four-way valve (2) and the second four-way valve (3) are powered down, and operation modes of each set of indoor modules (300) and each set of hydraulic modules (200), the on/off state of fans of the indoor heat exchangers (11) and the hydraulic heat exchangers (10), opening degrees of the first electronic expansion valves (12) of the indoor heat exchangers (11) and the first electronic expansion valves (12) of the hydraulic heat exchangers (10), and the on/off state of the first electromagnetic valves (13) and the second electromagnetic valves (14) are correspondingly adjusted based on the previous operation modes of each set of indoor modules (300) and each set of hydraulic modules (200).

2. The oil return control method of a multi-functional multi-split system with double four-way valves according to claim 1, wherein when the multi-split system only has one or more sets of indoor modules (300) switched from a refrigeration mode to the oil return mode, the first four-way valve (2) and the second four-way valve (3) are powered down, the indoor module (300) previously in the refrigeration mode remains a current operating state, the fan of the indoor module (300) previously in an air supply state remains on and the first electronic expansion valve (12) thereof is adjusted to a predetermined opening degree, and the first electronic expansion valve (12) of the indoor module (300) previously in an off state is adjusted to a predetermined opening degree.

3. The oil return control method of a multi-functional multi-split system with double four-way valves according to claim 1, wherein when the multi-split system only has one or more sets of indoor modules (300) switched from a heating mode to the oil return mode, the first four-way valve (2) and the second four-way valve (3) are powered down, the indoor module (300) previously in the heating mode is switched to refrigeration use and the fan thereof is turned off, the indoor module (300) previously in an off state remains off, and the first electronic expansion valves (12) of the indoor heat exchangers (11) of all the indoor modules (300) are adjusted to a predetermined opening degree.

4. The oil return control method of a multi-functional multi-split system with double four-way valves according to claim 2, wherein when the multi-split system only has one or more sets of indoor modules (300) switched from a heating/refrigeration mode to the oil return mode, the first electromagnetic valve (13) of each set of hydraulic modules (200) previously in an off state is turned off and the second electromagnetic valve (14) is turned on, and the first electronic expansion valve (12) of each set of hydraulic modules (200) is adjusted to a predetermined opening degree.

5. The oil return control method of a multi-functional multi-split system with double four-way valves according to claim 1, wherein when the multi-split system only has one or more sets of hydraulic modules (200) switched from a water heating mode to the oil return mode, the first four-way valve (2) and the second four-way valve (3) are powered down, each set of indoor modules (300) previously in an off state remains off, the fan of each set of indoor modules (300) previously in an air supply state remains on, and the first electronic expansion valves (12) of the indoor heat exchangers (11) of all the indoor modules (300) are adjusted to a predetermined opening degree.

6. The oil return control method of a multi-functional multi-split system with double four-way valves according to claim 1, wherein when the multi-split system has one or more sets of indoor modules (300) switched from a heating mode to the oil return mode and one or more sets of hydraulic modules (200) switched from a water heating mode to the oil return mode, the first four-way valve (2) and the second four-way valve (3) are powered down, each set of indoor modules (300) previously in an off state remains off, each set of indoor modules (300) previously in the heating mode is switched to refrigeration use and the fan thereof is turned off, the fan of each set of indoor modules (300) previously in an air supply state remains on, and the first electronic expansion valves (12) of the indoor heat exchangers (11) of all the indoor modules (300) are adjusted to a predetermined opening degree.

7. The oil return control method of a multi-functional multi-split system with double four-way valves according to claim 1, wherein when the multi-split system has one or more sets of indoor modules (300) switched from a refrigeration mode to the oil return mode and one or more sets of hydraulic modules (200) switched from a water heating mode to the oil return mode, the first four-way valve (2) and the second four-way valve (3) are powered down, the indoor module (300) previously in the refrigeration mode remains a current operating state, the fan of the indoor module (300) previously in an air supply state remains on, and the first electronic expansion valves (12) of the indoor heat exchangers (11) of the indoor modules (300) previously in the air supply state and an off state are adjusted to a predetermined opening degree.

8. The oil return control method of a multi-functional multi-split system with double four-way valves according to claim 5, wherein when the multi-split system only has one or more sets of hydraulic modules (200) switched from a water heating mode to the oil return mode, or has one or more sets of indoor modules (300) switched from a heating mode to the oil return mode and one or more sets of hydraulic modules (200) switched from a water heating mode to the oil return mode, or has one or more sets of indoor modules (300) switched from a refrigeration mode to the oil return mode and one or more sets of hydraulic modules (200) switched from a water heating mode to the oil return mode, the first electromagnetic valve (13) of each set of hydraulic modules (200) is turned off and the second electromagnetic valve (14) is turned on, each set of hydraulic modules (200) previously in the water heating mode remains a current operating state, each set of hydraulic modules (200) previously in an off state remains off, and the first electronic expansion valve (12) thereof is adjusted to a predetermined opening degree.

9. The oil return control method of a multi-functional multi-split system with double four-way valves according to claim 1, further comprising: an oil separator (5) arranged at the output end of the compressor (1).

10. The oil return control method of a multi-functional multi-split system with double four-way valves according to claim 1, further comprising: a gas-liquid separator (6) arranged at the input end of the compressor (1).

* * * * *